United States Patent [19]
Nishimura et al.

[11] Patent Number: 5,133,326
[45] Date of Patent: Jul. 28, 1992

[54] CLUTCH CONTROL APPARATUS FOR A MECHANICAL SUPERCHARGER

[75] Inventors: Eiji Nishimura; Toshihiro Matsuoka, both of Hiroshima, Japan

[73] Assignee: Mazda Motor Corporation, Hiroshima, Japan

[21] Appl. No.: 548,306

[22] Filed: Jul. 5, 1990

[30] Foreign Application Priority Data

| Jul. 5, 1989 | [JP] | Japan | 1-175008 |
| Jul. 20, 1989 | [JP] | Japan | 1-190018 |
| Jul. 20, 1989 | [JP] | Japan | 1-190019 |

[51] Int. Cl.⁵ .............................................. F02B 39/12
[52] U.S. Cl. ............................................... 123/559.3
[58] Field of Search ............................ 123/559.3, 561

[56] References Cited

U.S. PATENT DOCUMENTS

| 1,878,210 | 9/1932 | Vincent | 123/559.3 |
| 4,519,373 | 5/1985 | Hardy et al. | 123/559.3 |

FOREIGN PATENT DOCUMENTS

| 101541 | 6/1984 | Japan | 123/559.3 |
| 12733 | 1/1987 | Japan | 123/559.3 |
| 199927 | 9/1987 | Japan | 123/559.3 |

*Primary Examiner*—Michael Koczo
*Attorney, Agent, or Firm*—Fish & Richardson

[57] ABSTRACT

A clutch control apparatus for a mechanical supercharger is used in connection with a mechanical supercharger provided in the intake passage of an engine and driven by the output shaft of the engine through a clutch. The clutch control apparatus suppresses shock during clutch engagement and increases clutch life by controlling the slipping condition of the clutch when the mechanical supercharger is engaged.

1 Claim, 14 Drawing Sheets

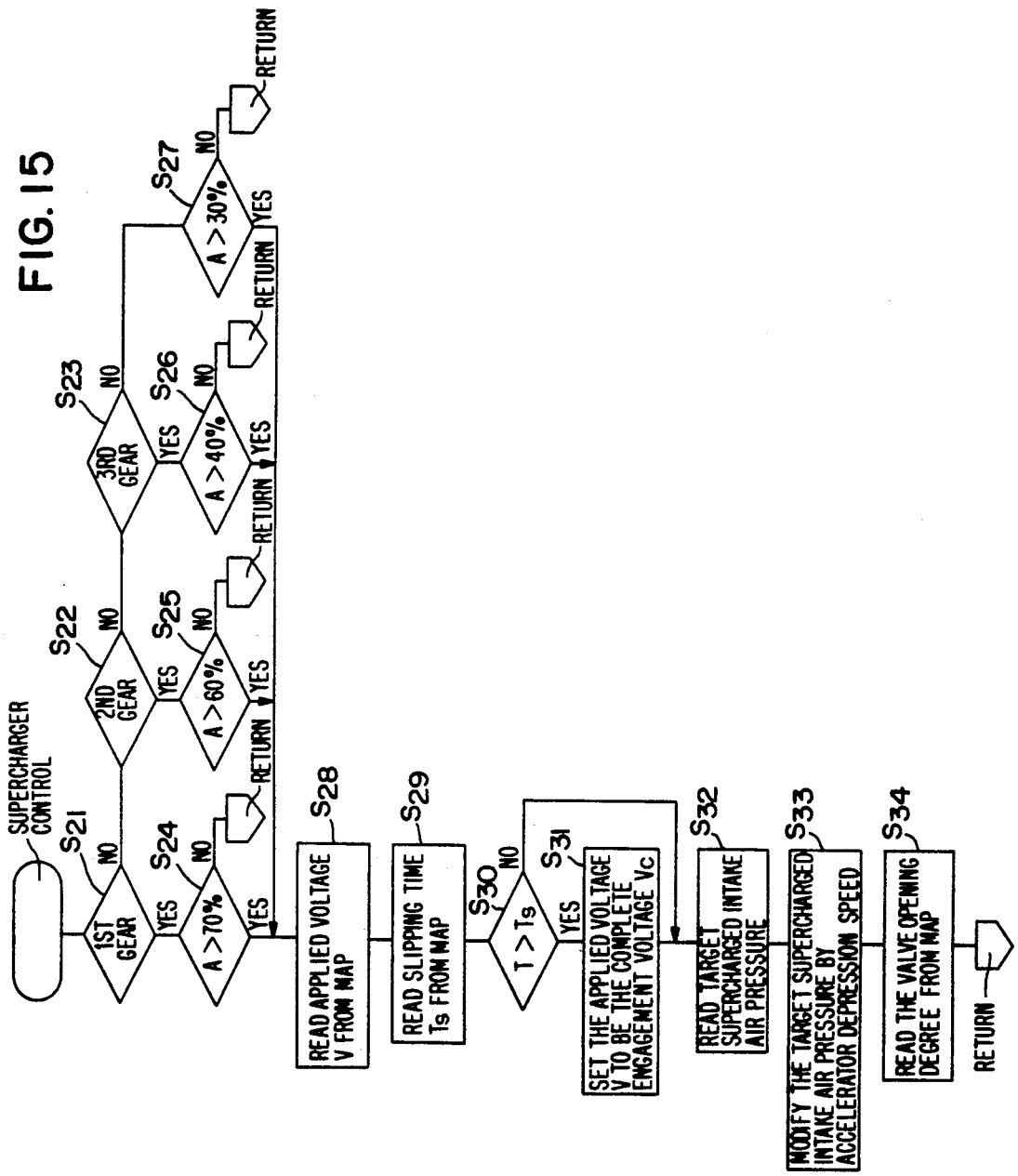

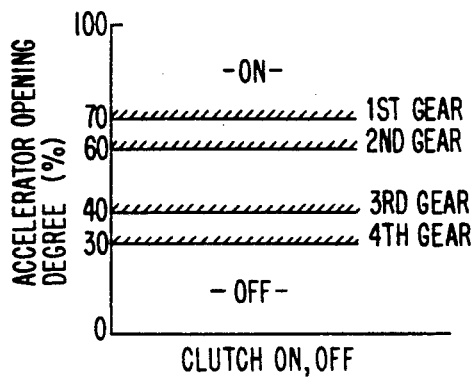
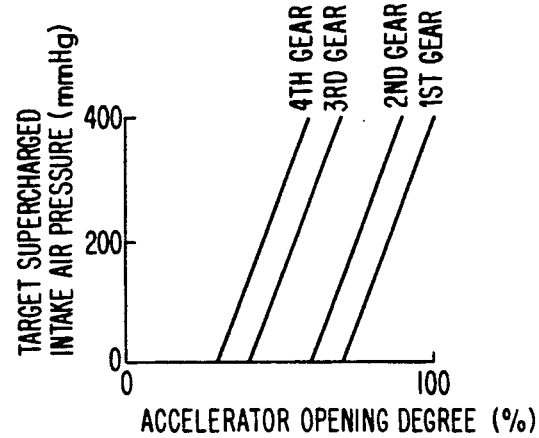
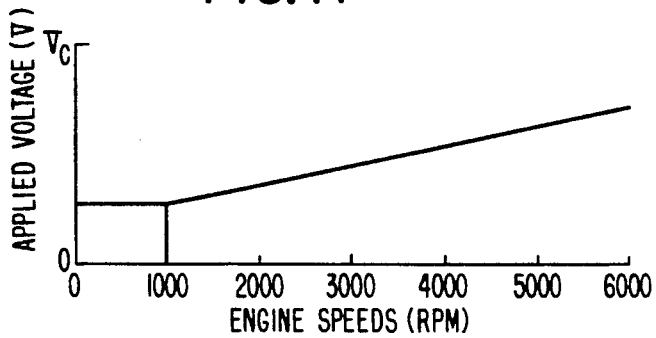
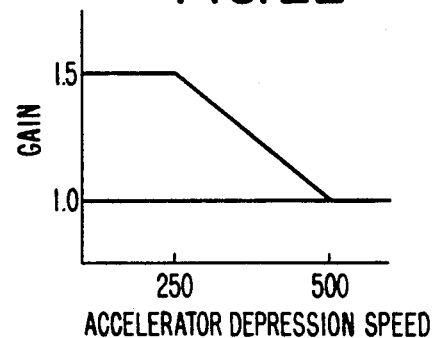
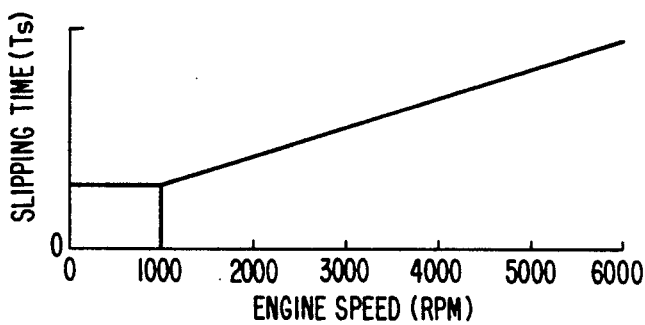
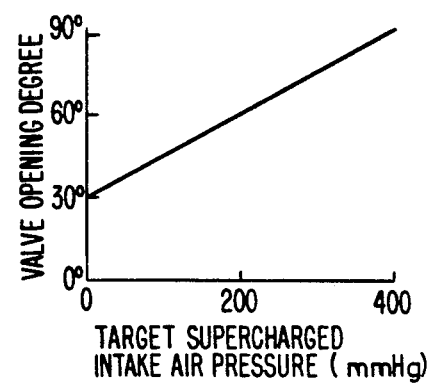

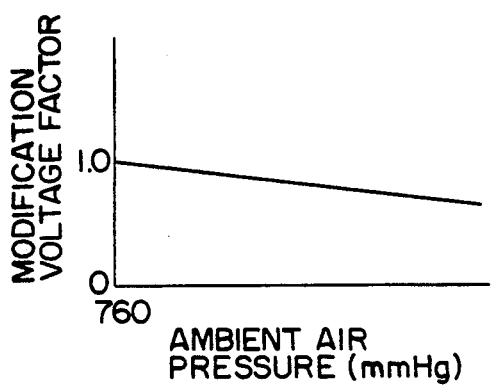
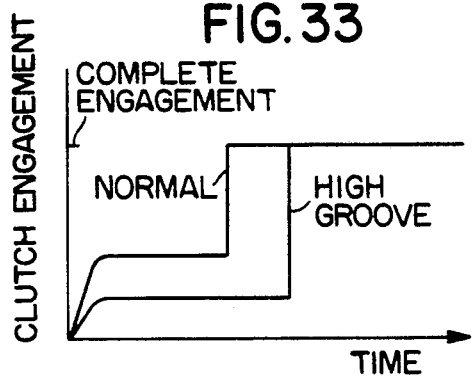
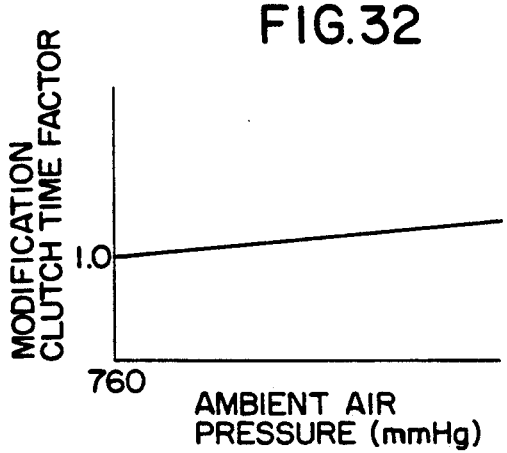
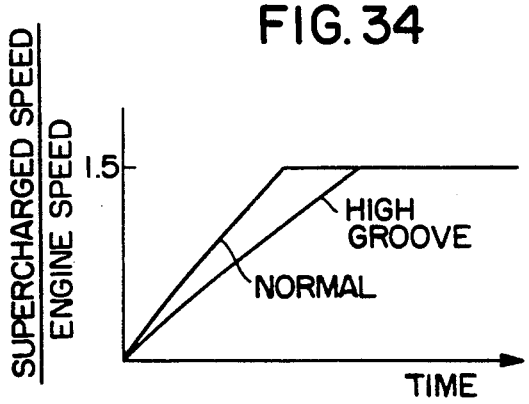

CLUTCH CONTROL APPARATUS FOR A MECHANICAL SUPERCHARGER

BACKGROUND OF THE INVENTION

1. Field of the Invention

This invention relates to a clutch control for a mechanical supercharger provided in the intake passage of the engine and driven by the output shaft of the engine through the clutch.

2. Description of the Prior Art

Recently, in engines for automotive vehicles, superchargers have been equipped to increase intake efficiency in order to increase engine output. As the supercharger, the turbo charger which is driven by exhaust gases and the mechanical supercharger which is driven by the engine output shaft are generally well known.

In the, case in which the mechanical supercharger is employed, a clutch is provided between the engine output shaft and the mechanical supercharger. By connecting or disconnecting the clutch based on the engine load, the mechanical supercharger is actuated in the high engine load region so as to increase the intake air amount and is stopped in the low engine load region to reduce driving loss. Further, in the low engine load region, the valve provided in the bypass passage which bypasses the mechanical supercharger is opened so that intake air is introduced through the bypass passage into the engine cylinder.

However, when the clutch of the mechanical supercharger is controlled in the manner described above, if the clutch is engaged at the timing the engine operating condition shifts to high engine load region from low engine load region, the mechanical supercharger has to be accelerated abruptly from zero speed to a high speed (for example 1.5 times the engine speed). This produces a large load on the engine output shaft and results in temporary reduction of engine output and shock to the power train. Further, when the clutch is engaged, the frictional elements of the clutch are kept in the condition where they are strongly pressed against each other and slide with a large mutual speed difference. Therefore, the frictional elements of the clutch wear earlier than expected.

With respect to such a problem, for example, Japanese Utility Model Application 62-12733 discloses a system which controls the clutch to engage intermittently when the engine operational condition changes to the region where the mechanical supercharger is to be actuated from the region where the mechanical supercharger is to be stopped. In accordance with this system, some reduction of shock may be expected, since the supercharger is accelerated step-wise.

However, even in the system described in the above prior art, when the clutch is engaged, especially at the first engagement stage, a large amount of shock still acts abruptly on the engine output shaft.

Also, the frictional elements of the clutch are still strongly engaged while a large amount of mutual slipping is occurring, and this engagement is repeated several times.

The engagement shock will be especially perceptible if it occurs while the vehicle is coasting and thus it will adversely affect the comfort of the driver and other passengers. Also when the vehicle is driven on high ground in a low ambient air pressure when the engine is not fully warmed up, or when the vehicle is running uphill, the engine power is reduced below its normal value. In such a condition, clutch engagement shock will greatly reduce driving comfort.

In order to prevent these kinds of problems, it is desirable to engage the clutch slowly with a smaller engagement force. But, this would result in a decreased acceleration response.

For the foregoing reasons, an object of the present invention is to suppress shock during the clutch engagement and to improve the acceleration response by controlling the slipping condition of the clutch of the mechanical supercharger when the mechanical supercharger is connected. In one embodiment, the slipping condition of the clutch is controlled in accordance with the stage of shifting of the automatic transmission. In another embodiment, the slipping condition of the clutch is controlled in accordance with the engine speed. In yet another embodiment, the slipping condition of the clutch is controlled in accordance with engine drivability.

The purpose of the present invention can be accomplished accordance with a first embodiment of the present invention by providing an engine equipped with the mechanical supercharger provided in the intake passage and driven through the clutch in response to engine condition, in which the engine has a power plant with a transmission, gear stage detecting means for detecting the gear stage of the transmission, and control means for controlling the slipping condition of the clutch in response to the gear stage of the transmission so that an engagement force of the clutch during the slipping condition becomes stronger as the gear stage becomes lower when the clutch in engaged.

In addition, the purpose of the present invention can be accomplished in accordance with a second embodiment of the present invention by providing, instead of the control means of the first inventive features, control means for controlling the slipping condition of the clutch in response to the gear stage of the transmission so that the slipping time of period becomes shorter as the gear stage becomes lower when the clutch is engaged.

Furthermore, the purpose of the present invention can be accomplished in accordance with a third embodiment of the present invention by providing, instead of the control means of the first invention features, control means for controlling the slipping condition of the clutch in response to the gear stage of the transmission so that the engagement force of the clutch during the slipping condition becomes stronger as the gear stage becomes lower and the period of slipping time becomes shorter as the gear stage becomes lower when the clutch is engaged.

In accordance with above constructions, in any of the first to the third embodiments, when the mechanical supercharger is actuated, the mechanical supercharger is connected with the output shaft of the engine through the controlled slipping engagement of the clutch. The mechanical supercharger can be accelerated moderately from stopped condition to a predetermined higher speed condition without causing a large abrupt load on the engine output shaft, whereby the shock during the clutch engagement can be reduced especially in the vehicle coasting condition in the higher gear stage.

In the first embodiment, the slipping condition of the clutch is adequately controlled in response to the gear stage of the transmission so that the engagement force of the clutch during the slipping condition becomes stronger as the gear stage of the transmission becomes lower. When the transmission is operated in the lower gear stage, transmitted torque amount of the clutch during the slipping condition becomes greater, whereby the supercharger produces sufficient supercharging effect to provide a sufficient acceleration response.

In the second embodiment, the slipping condition of the clutch is adequately controlled in response to the gear stage of the transmission so that the slipping time becomes shorter as the gear stage of the transmission becomes lower. When the transmission is operated in a lower gear stage, the clutch can complete the engagement in a short time, whereby the supercharger produces sufficient supercharging effect quickly to provide a sufficient acceleration response.

In the third embodiment, the slipping condition of the clutch is adequately controlled in response to the gear stage of the transmission so that the engagement force of the clutch during the slipping condition becomes stronger as the gear state of the transmission becomes lower and the period of slippage becomes shorter as the gear stage of the transmission becomes lower. When the transmission is operated in the lower gear stage, not only the effect of the first embodiment but also the effect of the second embodiment can be obtained.

The purpose of the present invention can also be accomplished in accordance with a fourth embodiment of the present invention by providing, in the engine equipped with the mechanical supercharger provided in the intake passage and driven through the clutch in response to engine operational condition, engine speed detecting means for detecting engine revolution speed and control means for controlling the slipping condition of the clutch when the clutch is engaged.

In addition, the purpose of the present invention can be accomplished in accordance with a fifth embodiment of the present invention by providing, instead of the control means of the fourth embodiment, control means for controlling the clutch so as to engage strongly as the engine speed increases during slipping engagement.

Furthermore, the purpose of the present invention can be accomplished in accordance with a sixth embodiment of the present invention by providing, instead of the control means of the fourth embodiment, control means for controlling the clutch so as to engage longer in time as the engine speed increases during slipping engagement.

Moreover, the purpose of the present invention can be accomplished in accordance with a seventh embodiment of the present invention by providing, instead of the control means of the fourth embodiment, control means for controlling the clutch so as to engage more strongly and for a longer time as the engine speed increases during slipping engagement.

In accordance with above constructions, in any of the fourth to the seventh embodiments, when the mechanical supercharger is actuated, the mechanical supercharger is connected with the output shaft of the engine through the controlled slipping engagement of the clutch. The mechanical supercharger can be accelerated moderately from the stopped condition to a predetermined higher speed condition without causing a large abrupt load on the engine output shaft, so that the shock during the clutch engagement can be reduced. Also, since the engine force between the frictional elements of the clutch is precisely controlled, substantial clutch wear can be prevented.

In the fourth embodiment, the slipping condition of the clutch is adequately controlled in response to engine speed. In the fifth embodiment, the slipping condition of the clutch is controlled so that the engagement force becomes larger as the engine speed increases. Therefore, the clutch shock during engagement can be effectively reduced and also clutch durability can be increased. Furthermore, when the mechanical supercharger is actuated in the high engine speed region, the mechanical super from taking a long time to reach the predetermined speed.

In the sixth embodiment, when the clutch in engaged, the clutch is engaged for a longer time as engine speed increases. Therefore, unnecessary continuation of slipping engagement in the low engine speed region can be prevented.

In the seventh embodiment, since the clutch is engaged more strongly and for a longer time as the engine speed increases, not only the effect of the fifth embodiment but also the effect of the sixth embodiment can be obtained.

The purpose of the present invention can also be accomplished in accordance with an embodiment of the present invention by providing the engine equipped with the mechanical supercharger provided in the intake passage and driven through the clutch in response to engine operational condition, lower drivability condition detecting means for detecting a condition where the power of the vehicle is lower than the normal value, and control means for controlling the slipping condition of the clutch when the clutch is engaged so that the engagement force becomes smaller in response to the signal detected by the lower drivability condition detecting means.

In accordance with the eight embodiment, when the mechanical supercharger is actuated, the mechanical supercharger is connected with the output shaft of the engine through the controlled slipping engagement of the clutch. The mechanical supercharger can be accelerated moderately from a stopped condition to a predetermined higher speed condition without causing a large abrupt load on the engine output shaft, and thus the shock during the clutch engagement can be reduced. Also, since the engaging force between the frictional elements of the clutch is precisely controlled, clutch wear is minimized. When the vehicle is running in places at high altitude where the engine power is reduced due to the low ambient air pressure, the engagement force of the clutch during the slipping condition is made smaller so as to prevent the driving feeling of the vehicle from being destroyed.

BRIEF DESCRIPTION OF THE DRAWINGS

FIG. 15 is a flow chart showing a subroutine for the supercharged intake air pressure control of the embodiment of FIG. 13;

FIGS. 16 to 18 are drawings illustrating maps used in the control of the supercharger of this embodiment;

FIGS. 21 to 23 are drawings illustrating maps used in the supercharged intake air control;

FIGS. 28 to 32 are drawings illustrating maps used in the control of the supercharger of this embodiment;

FIGS. 33 and 34 are graphs showing an engagement behavior of the clutch as well as the speed change of the supercharger in accordance with this embodiment; and, FIGS. 35 to 37 are drawings illustrating maps used in the supercharged intake air control.

DETAILED DESCRIPTION OF THE INVENTION

The first through third embodiments are discussed below with reference to FIGS. 1-12.

Figure 1:
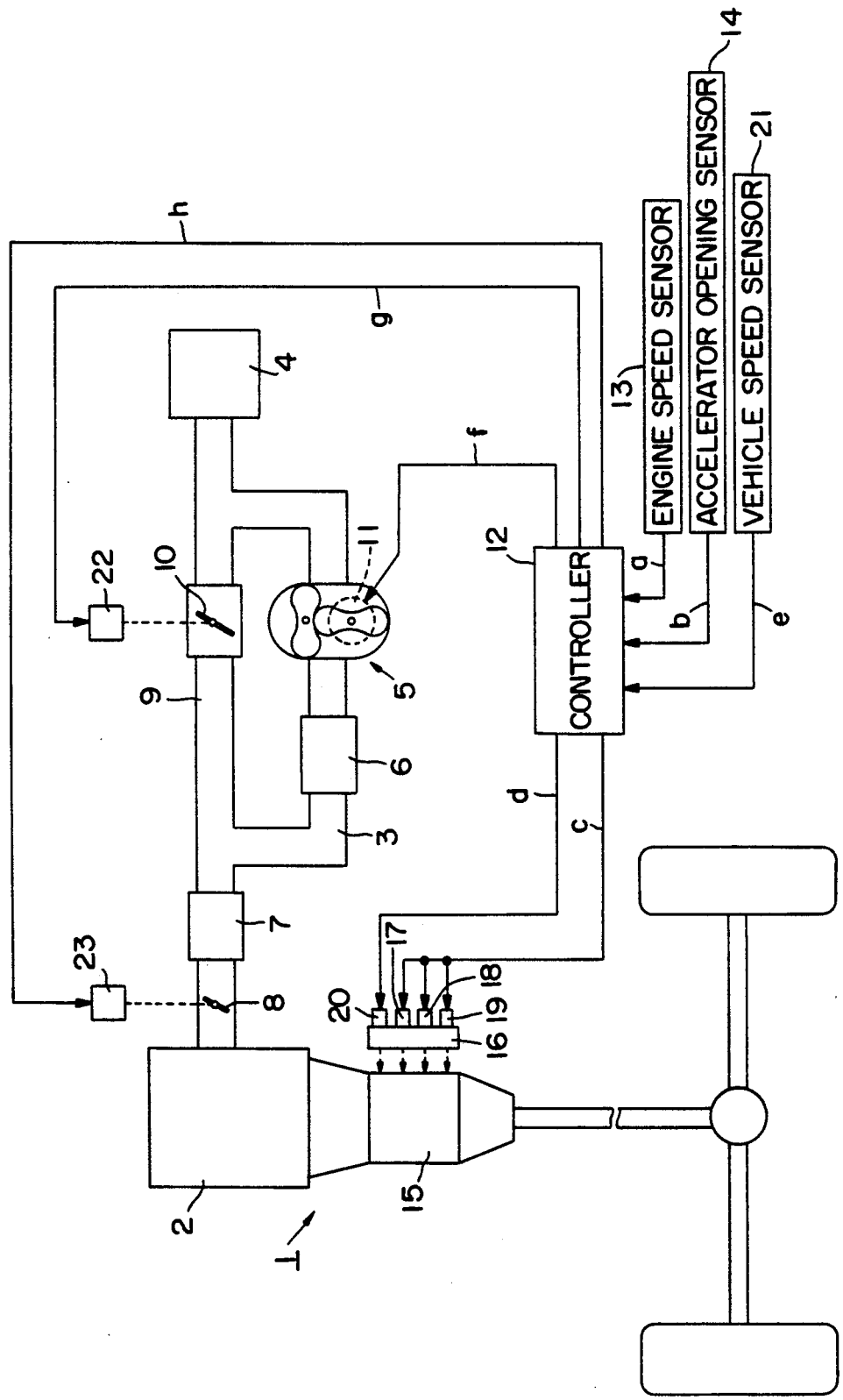
FIG. 1 is a system drawing showing a control system for the engine intake apparatus and the automatic transmission in accordance with one embodiment of the present invention.

In FIG. 1, in an intake passage 3 which introduces intake air into an engine 2 of a power plant 1, there are provided an air cleaner 4, a mechanical supercharger 5, an intercooler 6, an air flow meter 7 and a throttle valve 8, in this order from the upstream end of intake passage 3. Also, in intake passage 3 there is provided a bypass passage 9 in order to bypass the mechanical supercharger 5 and the intercooler 6. A bypass valve 10 is provided in the bypass passage 9.

The mechanical supercharger 5 is of the roots blower type, which is driven by a output shaft of the engine 2 through an electromagnetic clutch 11. The mechanical supercharger 5 compresses air introduced into the intake passage 3 from the air cleaner 4 so that the air can be delivered into cylinders of the engine 2 through the intercooler 6, the air flow meter 7 and the throttle valve 8. Then, the bypass valve 10 is controlled to open when the mechanical supercharger 5 is stopped so that air can be introduced into the engine cylinders through the bypass passage 9. The opening degree of the bypass valve 10 is controlled to adjust the air amount introduced into the engine cylinders through the bypass passage 9 in order to maintain the intake air pressure at an optimum value.

In addition a controller 12 is provided which controls the throttle valve 8, the bypass valve 10 and the electromagnetic clutch 11. The controller 12 inputs a signal a from an engine speed sensor 13 which detects an engine speed and a signal b from an accelerator opening sensor 14 to detect the opening of an accelerator.

This controller 12 outputs shift change signals c to shift solenoid valves 17 to 19 and a lock-up signal d to a lock-up solenoid valve 20 which are included in an oil pressure control unit 16 for an automatic transmission 15 of the power plant 1 so as to perform the shift change control and the lock-up control for the automatic transmission 15. To perform these controls, the controller 12 inputs a signal e from a vehicle speed sensor 21 to detect a vehicle speed in addition to the signals a and b.

Then, the controller 12 performs the slipping control for the electromagnetic clutch 11 in response to the gear stage of the automatic transmission 15 while the electromagnetic clutch 11 is connected as well as the connecting and disconnecting controls for the electromagnetic clutch in response to the accelerator opening degree detected by the sensor 14 and the gear stage of the automatic transmission 15. In addition, the controller 12 controls the adjustment of the opening of the bypass valve 10 in response to the accelerator opening and the gear stage when the electromagnetic clutch is actuated s as to control the supercharged pressure. Therefore, the controller 12 outputs a clutch control signal f to the electromagnetic clutch 11 and a bypass control signal g to the actuator 22 for the bypass valve 10. Also, the controller 12 outputs a throttle control signal h so as to control the actuator 23 for the throttle valve 8 in response to the accelerator opening degree.

Figure 2:
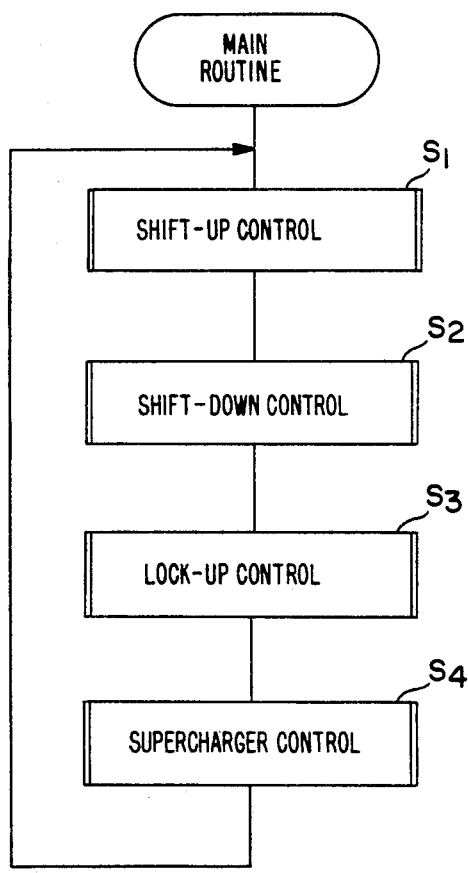
FIG. 2 is a flow chart showing a main routine for the control system of this embodiment.

Hereinafter, referring now to FIGS., 2 to 12, the details of the entire system control by the controller 12 is described. FIG. 2 is a flow chart showing a main routine. The controller 12 performs steps S1, S2 and S3 to control the shift-up, shift-down and lock-up operations for the automatic transmission 15 and step S4 to control the clutch and the supercharged intake air pressure for the supercharger.

For the shift-up control and the shift-down control the controller 12 outputs the shift change signal to the shift solenoid valves 17 to 19 in response to the accelerator opening degree and the vehicle speed which are detected by the sensors 14 and 21, which are shown in FIG. 1, in order to set the gear stage of the automatic transmission 15 adequately in response to the engine operating conditions. For the lock-up control, the controller 12 outputs the lock-up signal d to the lock-up solenoid valve 20 in response to the accelerator opening degree and the vehicle speed so as to engage or release the lock-up device of the torque convertor provided in the automatic transmission 15 depending on the vehicle running conditions.

On the other hand, the controller 12 performs an interruption routine according to a predetermined time schedule as well as the main routine. The interruption routine is performed according to FIG. 3. First of all, in step S11, the controller 12 inputs the signals a, b and c from the sensors 13, 14 and 21 which are shown in FIG. 1. Then, in steps S12 and S13, the controller 12 outputs the shift change signals c and the lock-up signal d to the shift solenoid valves 17 to 19 and the lock-up solenoid valve 20, respectively. Further, in step S14, the controller 12 adds 1 to the value stored in the counter T of the slipping timer for the clutch control which is described in detail later. Then, in step S15, the controller 12 outputs the clutch control signal f and the bypass control signal to the electromagnetic clutch 11 and the actuator 22 for the bypass valve 10, respectively.

Figure 4:
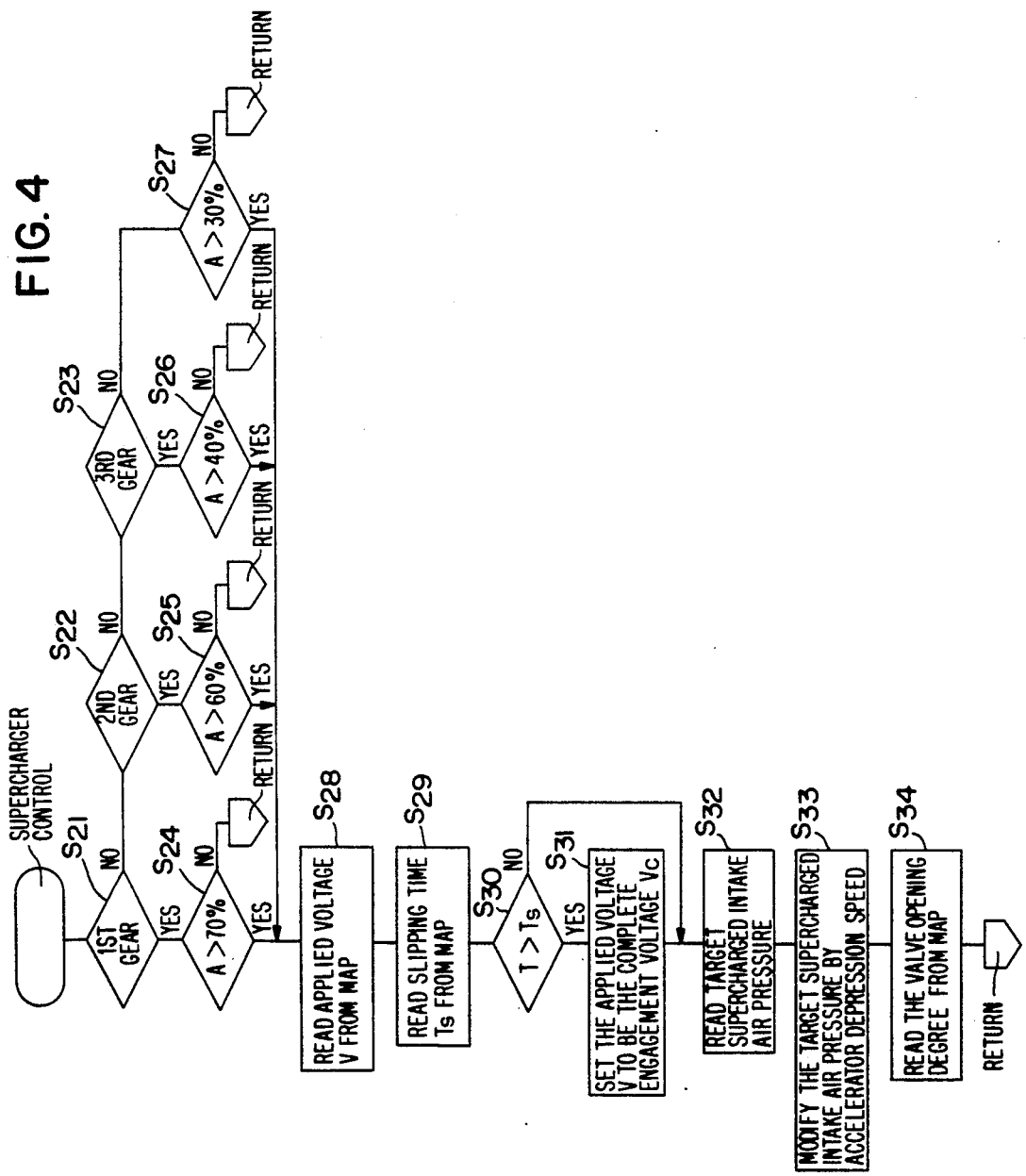
FIG. 4 is a flow chart showing a subroutine for the supercharged intake air pressure control of this embodiment.
Figure 5:
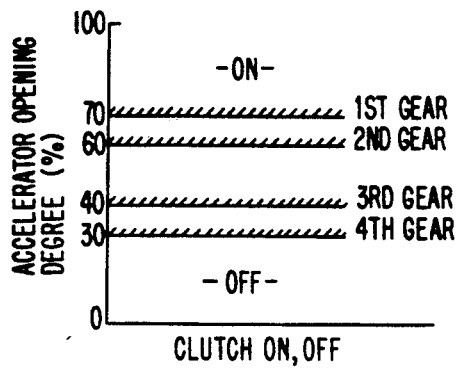
FIGS. 5 to 7 are drawings illustrating maps used in the control of the supercharger of this embodiment.
Figure 10:
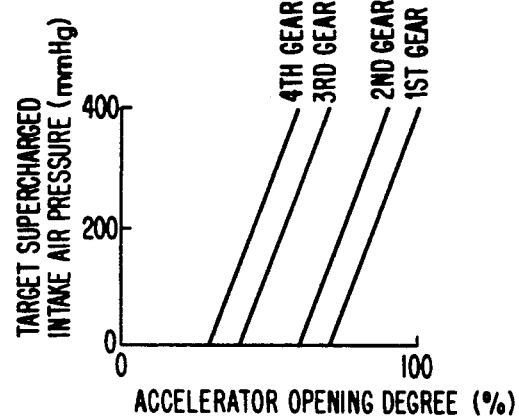
FIGS. 10 to 12 are drawings illustrating maps used in the supercharged intake air control.

On the other hand the supercharger control of the main routine indicated in step S4 in FIG. 2 is performed according to the flow chart of FIG. 4. In this control, at first in steps S21 to S23, the controller 12 detects the gear stage of the automatic transmission 20, then in steps S24 to S27, the controller 12 judges if the accelerator opening degree A is greater than the predetermined opening degree in each gear stage. That is, when the accelerator opening degree is less than 70% in the first gear stage, or less than 60% in the second gear stage, or less than 40% in the third gear stage, or less than 30% in the fourth gear stage, the controller 12 skips steps S28 to S34 and returns to the beginning of the flow chart. By this control, as shown in FIG. 5, when the accelerator opening degree is less than the predetermined value in each gear stage, the electromagnetic clutch 11 is held in the OFF state to stop the supercharger 5. At the same time, in this low engine load condition, the bypass valve 10 is kept in the fully opened state so that the intake air can be introduced into the cylinders of the engine 2 through the bypass passage 9.

On the other hand, in each gear stage of the automatic transmission 15, when the accelerator opening degree A is larger than the above predetermined opening degree; i.e. the engine load resides in the higher load region which is determined in each gear stage, the controller 12 performs steps S28 to S34. First of all, in step S28, the controller 12 reads the applied voltage V to electromagnetic clutch 11 according to the predetermined applied voltage map, then, in step S29, reads the slipping time Ts from the predetermined slipping map to control the electromagnetic clutch 11 in the slipping condition during the engagement of the electromagnetic clutch 11.

Figure 6:
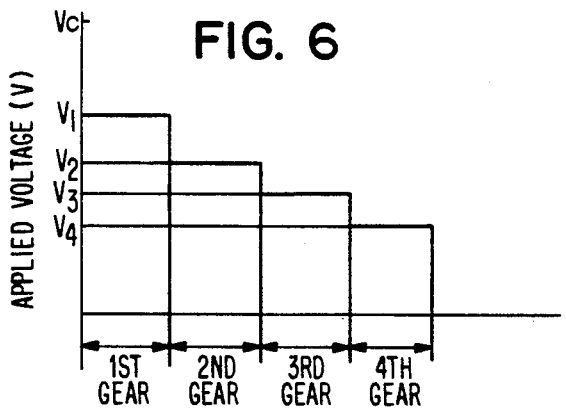
Figure 11:
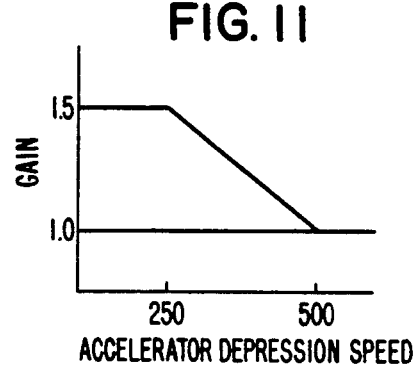

FIG. 6 shows the applied voltage map. The applied voltage V is designed to be a smaller value than the complete engagement voltage Vc which is designed to engage the electromagnetic clutch completely, and also, is designed to become greater as the gear stage becomes lower.

Therefore, the controller 12 adopts as the applied voltage V for the electromagnetic clutch 11 a first gear clutch voltage V1 when the controller 12 detects the first gear stage in steps S21 to S23, or a second gear clutch voltage V2 when the controller 12 detects the second gear stage, or a third gear clutch voltage V3 when the controller 12 detects the third gear stage, or a fourth gear clutch voltage V4 when the controller 12 detects the fourth gear.

Figure 7:
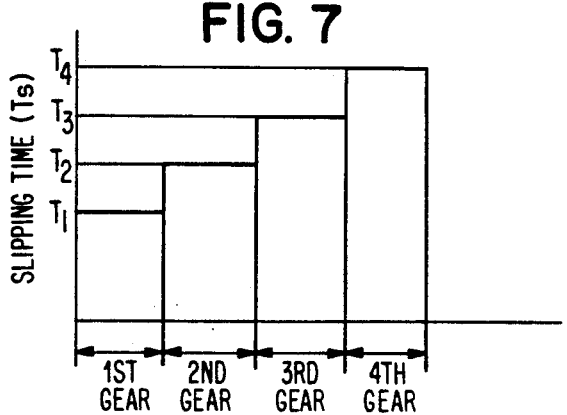
Figure 12:
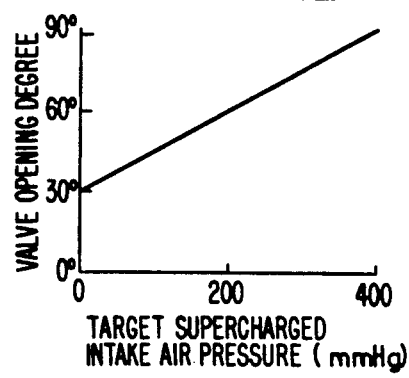

FIG. 7 shows the slipping time map. The slipping time Ts is designed to become shorter stepwise as the gear stage of the automatic transmission 15 becomes lower. Accordingly, the controller 12 adopts as the slipping time Ts a first gear slipping time T1 when the controller 12 detects the first gear stage in steps S21 to S23, or a second gear slipping time T2 when the controller 12 detects the second gear stage, or a third gear slipping time T3 when the controller 12 detects the third gear, or a fourth gear slipping time T4 when the controller 12 detects the fourth gear.

Figure 3:
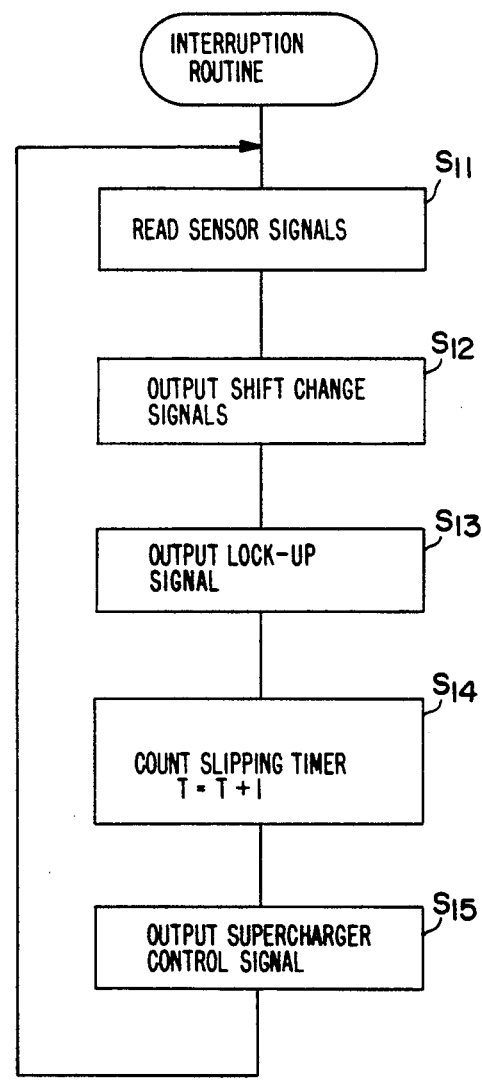
FIG. 3 is a flow chart showing a interruption routine for the control system of this embodiment.

Further, the controller 12 in step S30 judges if the count value T of slipping timer counted in step S14 of the interruption routine shown in FIG. 3 becomes greater than the slipping time Ts read from the above map. In this instance, the slipping timer initiates its counting from the timing when the accelerator opening degree A becomes greater than the predetermined opening degree in any step of the above steps S24 to S27. And, when the count value T exceeds the slipping time Ts, the controller 12 performs step S31 to set the applied voltage V to the electromagnetic clutch 11 to be the complete engagement voltage Vc.

Then, the controller 12 outputs the clutch control signal f to the electromagnetic clutch in step S15 of the above interruption routine so that the electromagnetic clutch 11 can be engaged by being actuated through the applied voltage V read from the map in step S28 or the complete engagement voltage Vc set in step S31.

In accordance with this arrangement, when the accelerator opening A becomes greater than the predetermined value in each gear stage, engagement of the electromagnetic clutch 11 is controlled through the voltage V, which is smaller than the complete engagement voltage Vc, until the slipping time Ts passes. After the time period of Ts, the electromagnetic clutch 11 is controlled to engage completely by having applied thereto the complete voltage Vc. Therefore, when the operating condition of the supercharger 5 is shifted from the non-operational region to the operational region, the engagement shock loaded on the engine output shaft abruptly upon clutch engagement can be reduced.

Figure 8:
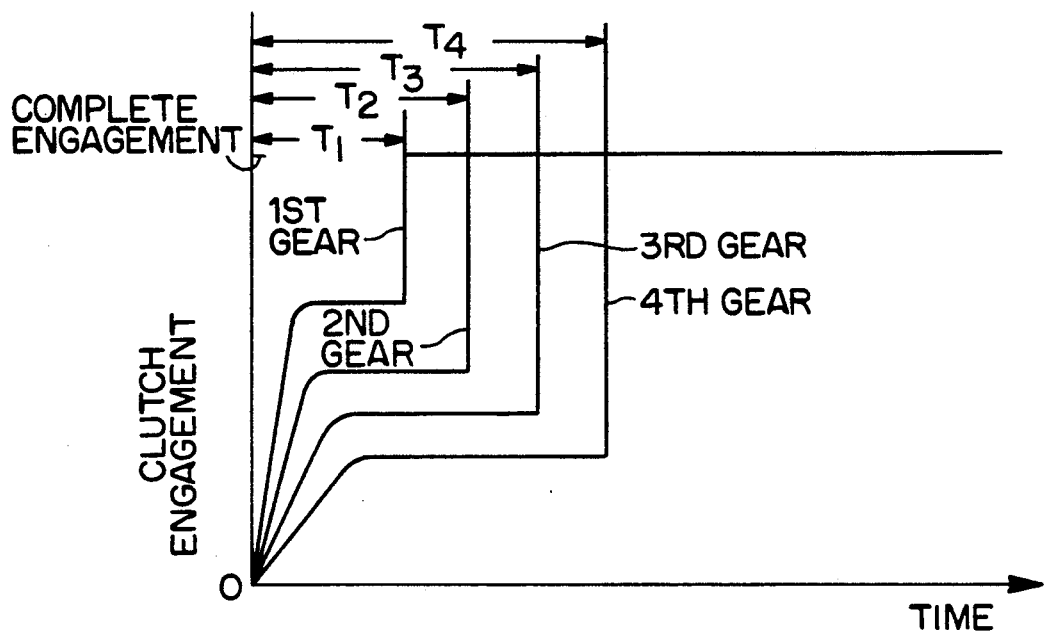
FIGS. 8 and 9 are graphs showing the engagement behavior of the clutch as well as the speed change of the supercharger in accordance with this embodiment.
Figure 9:
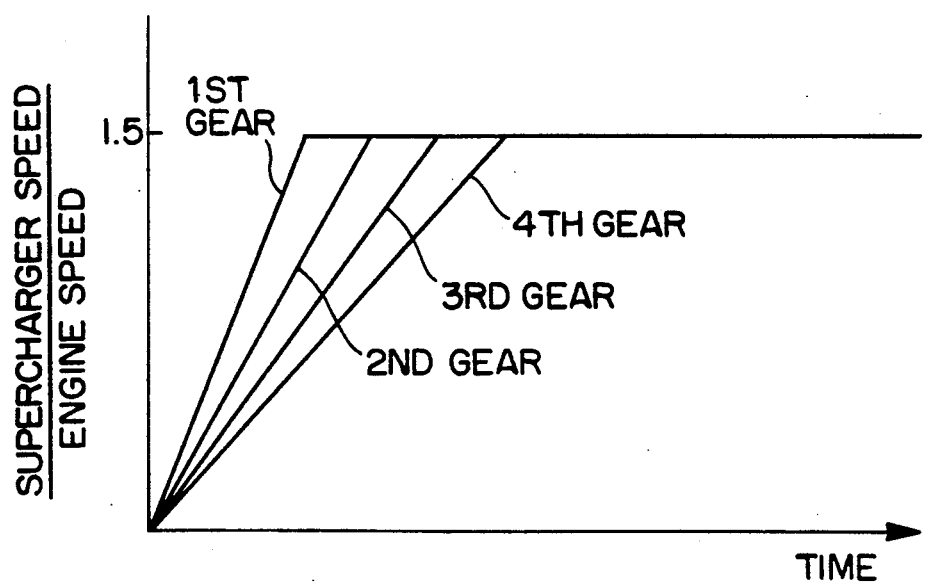

Furthermore, since the applied voltage V is set to become larger stepwise as the gear stage becomes lower and the slipping time Ts is set to be shorter as the gear stage becomes lower and longer as the engine speed increases, as shown in FIGS. 8 and 9, the electromagnetic clutch 11 is controlled to engage more strongly in a short time during clutch engagement in the lower gear stage. Accordingly, when the gear stage is low, the torque transmitted to the electromagnetic clutch 11 during the slipping condition can be kept at a sufficient level so that the electromagnetic clutch 11 can complete the engagement in a short time to produce the supercharging effect immediately. On the other hand, when the gear stage is high, the slipping time becomes longer and also the engagement force is weaker, whereby the engagement shock of the clutch can be effectively suppressed without damaging the driving feeling in the vehicle coasting condition.

In addition, in the operational region of the supercharger 5, the controller 12 performs the supercharged intake air pressure control after the above clutch control. Namely, according to the flow chart of FIG. 4, in step S32, the controller 12 reads the target supercharged intake air pressure, which is predetermined based on the accelerator opening degree and the gear stage, from the map shown in FIG. 10. Then, step S33, the controller 12 reads the gain, which is predetermined based on the depression speed of the accelerator, from the map shown in FIG. 11. And then, the controller 12 modifies the above target supercharged intake air pressure by multiplying it by the gain. Further, in step S34, the controller 12 reads the target opening of the bypass valve 10 from the map shown in FIG. 12 to obtain the modified target supercharged intake air pressure. And, the controller 12 outputs the bypass control signal g according to the interruption routine in FIG. 3 to control the bypass valve 10 to open to the target opening, whereby the supercharged intake air pressure can be controlled to be an adequate value.

The fourth through seventh embodiments are discussed below with reference to FIGS. 13-23. In the embodiments shown in FIGS. 13-23, the controller 12 performs the slipping control for the electromagnetic clutch 11 in response to the engine speed while the electromagnetic clutch 11 is connected as well as the connecting and disconnecting controls for the electromagnetic clutch 11 in response to the accelerator opening degree detected by the sensor 14 and the gear stage of an automatic transmission 15. Further, the controller 11 performs the control for adjusting the opening of the bypass valve 10 in response to the accelerator opening and the gear stage when the electromagnetic clutch is actuated so as to control the supercharged pressure. Therefore, the controller 12 outputs a clutch control signal f to the electromagnetic clutch 11 and a bypass control signal g to the actuator 22 for the bypass valve 10. Also, the controller 12 outputs a throttle control signal h so as to control the actuator 23 for the throttle valve 8 in response to the accelerator opening degree.

Figure 13:
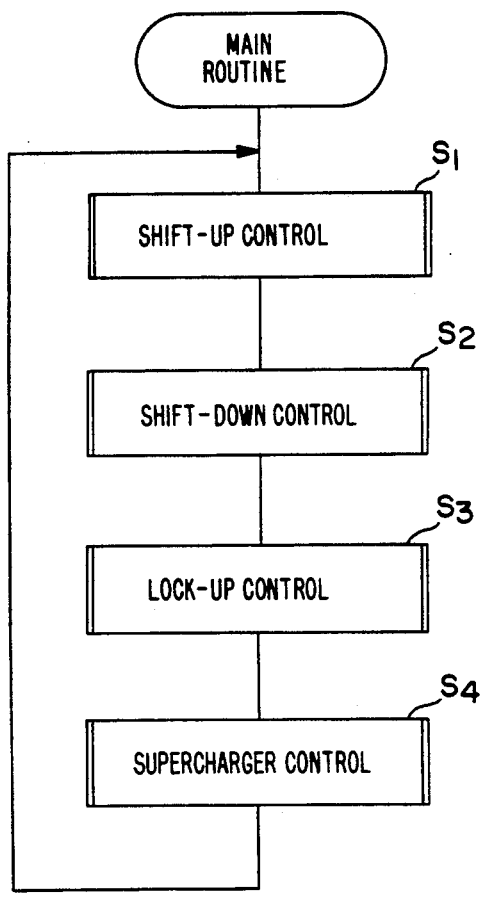
FIG. 13 is a flow chart showing a main routine for the control system.

Hereinafter, referring now to FIGS. 13 to 23, the details of the control of the whole system by the controller 12 are described. FIG. 13 is a flow chart showing a main routine. The controller 12 performs steps S1, S2 and S3 to control the shift-up, shift-down and lock-up operations for the automatic transmission 15 and step 54 to control the clutch and the supercharged intake air pressure for the supercharger.

For the shift-up control and the shift-down control, the controller 12 outputs the shift change signal to the shift solenoid valves 17 to 19 in response to the accelerator opening degree and the vehicle speed which are detected by the sensors 14 and 21, which are similar to those shown in FIG. 1, in order to set the gear stage of the automatic transmission 15 adequately in response to the engine operating conditions. For the lock-up control, the controller 13 outputs the lock-up signal d to the lock-up solenoid valve 20 in response to the accelerator opening degree and the vehicle speed so as to engage or release the lock-up device of the torque convertor provided in the automatic transmission 15 depend on the vehicle running conditions.

On the other hand, the controller 12 performs an interruption routine according to the predetermined time schedule as well as the main routine. The interruption routine is performed according to FIG. 14. First of all, in step S11, the controller 12 inputs the signals a, b and c from the sensors 13, 14 and 21 which are shown in FIG. 1. Then, in steps S12 and S!3, the controller 12 outputs the shift change signals c and the lock-up signal d to the shift solenoid valves 17 to 19 and the lock-up solenoid valve 20, respectively. Further, in step S14, the controller 12 adds 1 to the value in counter T of the slipping timer for the clutch control which is described in detail later. Then, in step S15, the controller 12 outputs the clutch control signal f and the bypass control signal g to the electromagnetic clutch 11 and the actuator 22 for the bypass valve 10, respectively.

On the other hand, the supercharger control of the main routine indicated in step S4 in FIG. 13 is performed according to the flow chart of FIG. 15. In this control, at first in steps S21 and S23, the controller 12 detects the gear stage of the automatic transmission 15, then in steps S24 to S27, the controller 12 judges if the accelerator opening degree A is greater than the predetermined opening degree in each gear stage. That is, when the accelerator opening degree is less than 70% in the first gear stage, or less than 60% in the second gear stage, or less than 40% in the third gear stage, or less than 30% in the fourth gear stage, the controller 12 skips steps S28 to S34 and returns to the beginning of the flow chart. By this control, as shown in FIG. 16, when the accelerator opening degree is less than the predetermined value in each gear stage, the electromagnetic clutch 11 is held in the OFF state to stop the supercharger 5. At the same time, in this engine load condition, the bypass valve 10 is kept in the fully opened state so that the intake air can be introduced into the cylinders of the engine 2 through the bypass passage 9.

On the other hand, in each gear stage of the automatic transmission 15, when the accelerator opening degree A is larger than the above predetermined opening degree; i.e. the engine load resides in the higher load region which is determined in each gear state, the controller 12 performs steps S28 to S34. First of all, in step S28, the controller 13 reads the applied voltage V to electromagnetic clutch 11 according to the predetermined applied voltage map, then, in step S29, reads the slipping time Ts from the predetermined slipping map to control the electromagnetic clutch in the slipping condition during the engagement of the electromagnetic clutch 11.

FIG. 17 shows the applied voltage map. The applied voltage V is designed to be a smaller value than the complete engagement voltage Vc which is designed to engage the electromagnetic clutch completely, and also, is designed to become greater as the engine speed increase. FIG. 18 shows the slipping time map. The slipping time Ts is designed to become longer as the engine speed increases.

Figure 14:
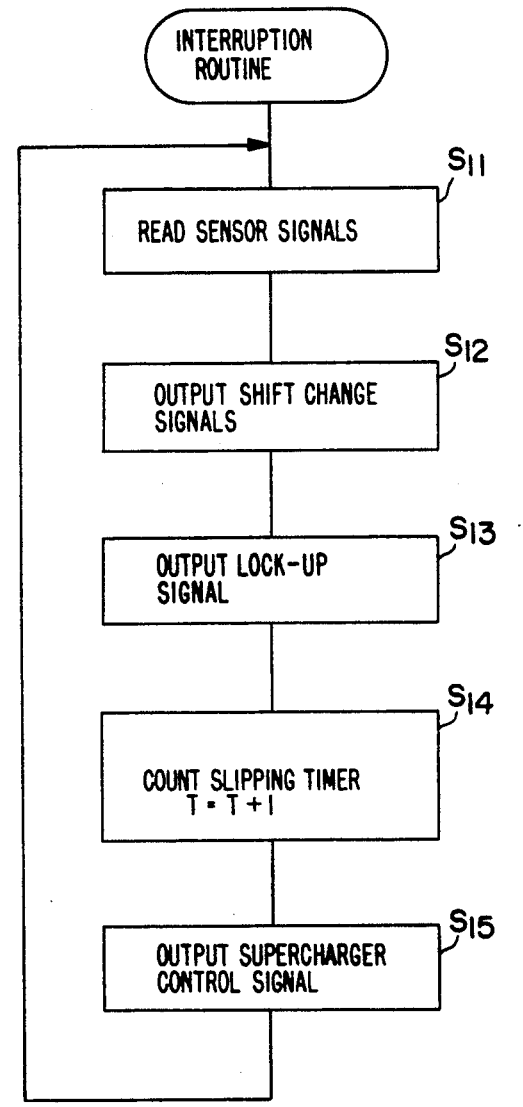
FIG. 14 is a flow chart showing an interruption routine for the control system.

Further, the controller 12, in step S30, judges if the count value T of slipping timer counted in step S14 of the interruption routine shown in FIG. 14 becomes greater than the slipping time Ts read from the above map. In this instance, the slipping timer initiates its counting from the time when the accelerator opening degree A becomes greater than the predetermined opening degree in any step of the above steps S24 to S27. And, when the count value T exceeds the slipping time Ts, the controller 12 performs step S31 to set the applied voltage V to the electromagnetic clutch 11 to be the complete engagement voltage Vc.

Then, the controller 12 outputs the clutch control signal f to the electromagnetic clutch 11 in step S15 of the above interruption routine so that the electromagnetic clutch 11 can be engaged by being actuated through the applied voltage V read from the map in step S28 or the complete engagement voltage Vc set in step S31.

In accordance with this arrangement, when the accelerator opening A becomes greater than the predetermined value in each gear stage, the engagement of the electromagnetic clutch 11 is controlled through the voltage V, which is smaller than the complete engagement voltage Vc, until the slipping time Ts passes. After the time period of Ts, the electromagnetic clutch 11 is controlled to engage completely by having applied thereto the complete voltage Vc. Therefore, when the operating condition of the supercharger 5 is shifted from the non-operational region to the operational region, the engagement shock loaded on the engine output shaft abruptly at the timing of the clutch engagement can be reduced. And also, the electromagnetic clutch 10 can be protected from being worn by the strong engagement force, since the engagement of the electromagnetic clutch 11 is precisely controlled so as not to cause great friction between frictional elements.

Figure 19:
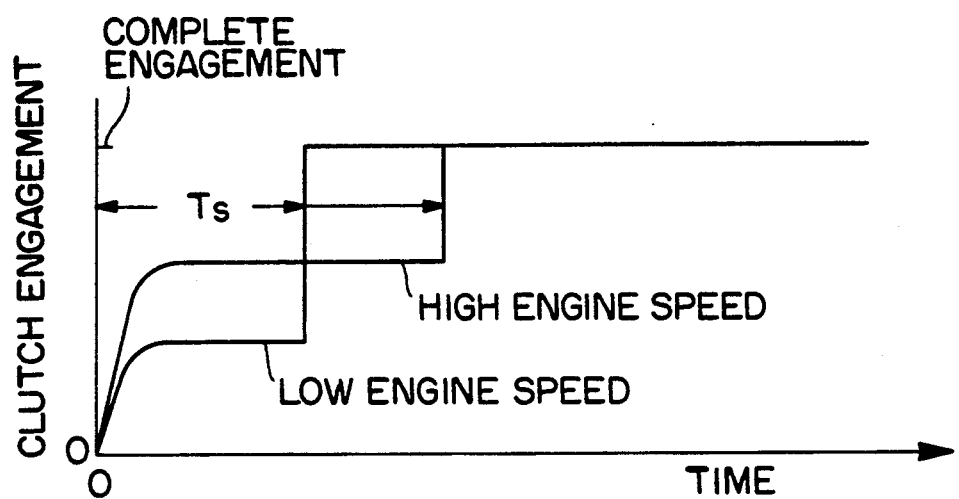
FIGS. 19 and 20 are graphs showing the engagement behavior of the clutch as well as the speed change of the supercharger in accordance with this embodiment.
Figure 20:
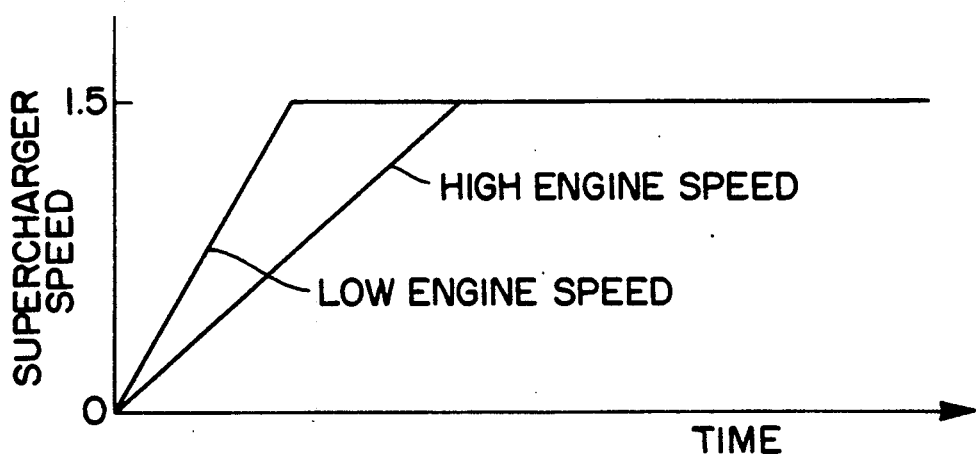

Furthermore, since the applied voltage V is set to become larger as the engine speed increases and the slipping time Ts is set to be longer as engine speed increases, as shown in FIGS. 19 and 20, the electromagnetic clutch 11 is controlled to engage more strongly and for a longer time during clutch engagement in the high engine speed condition as compared with the low engine speed condition. Accordingly, when the engine speed is high, it does not take a long time to accelerate the supercharger 5 to a predetermined rotational speed, i.e. 1.5 times of the engine speed. On the other hand, when the engine speed is in the low range, unnecessary engagement of the electromagnetic clutch 11 during a long period of slipping time can be prevented. As a result, regardless of the engine speed, the engagement shock of the clutch can be effectively prevented in any event and the durability of the clutch can be increased without destroying the responsiveness of the supercharger 5 especially in the high engine speed region.

In addition, in the operational region of the supercharger 5, the controller 12 performs the supercharged intake air pressure control after the above clutch control. Namely, according to the flow chart of FIG. 15 in step S32, the controller 12 reads the target supercharged intake air pressure, which is predetermined based on the accelerator opening degree and the gear stage, from the map shown in FIG. 21. Then, in step S33, the controller 12 reads the gain, which is predetermined based on the depression speed of the accelerator, from the map shown in FIG. 22. And then, the controller 12 modifies the above target supercharged intake air pressure by multiplying it by the gain. Further, in step S34, the controller 12 reads the target opening of the bypass valve 10 from the map shown in FIG. 23 to obtain the modified target supercharged intake air pressure. And, the controller 19 outputs the bypass control signal g according to the interruption routine in FIG. 14 to control the bypass valve 10 to open to the target opening, whereby the supercharged intake air pressure can be controlled to be an adequate value.

The eighth embodiment is discussed below with reference to FIGS. 24–37.

Figure 24:
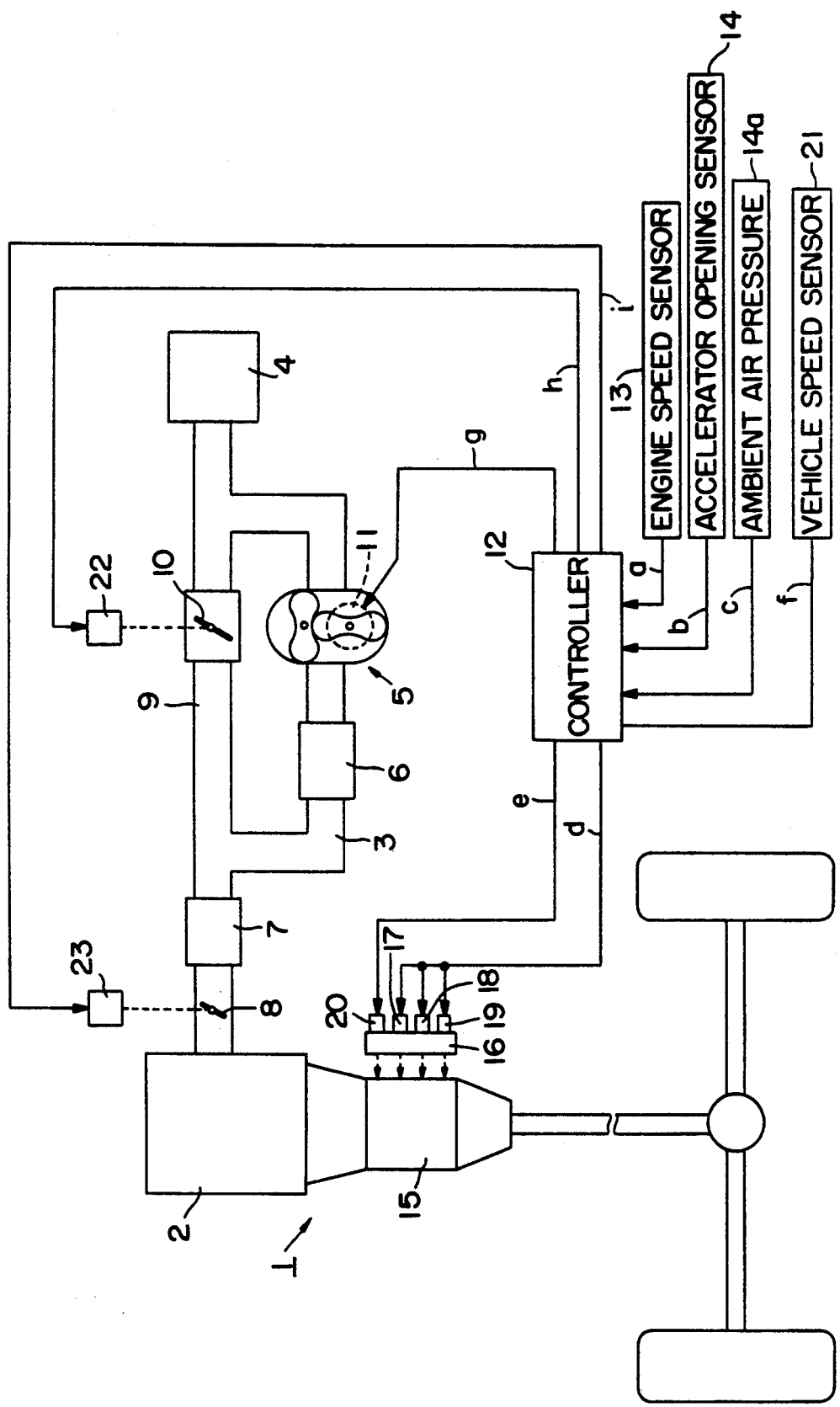
FIG. 24 is a system drawing showing a control system for the engine intake apparatus and the automatic transmission in accordance with another embodiment of the present invention.

In the embodiment of FIG. 24, there is provided an ambient pressure sensor 14a to detect an ambient air pressure. The intake air density of the engine 2 when the engine is operated by normal aspiration depends on the ambient air pressure. Therefore, when the vehicle is running in places at high altitude, the air/fuel ratio changes to reduce the engine output. The controller 12 inputs an ambient signal c as lower drivability signal.

The controller 12 outputs shift change signal d to shift solenoid valves 17 to 19 and a lock-up signal e to a lock-up solenoid valve 20 which are included in an oil pressure control unit 16 for an automatic transmission 15 so as to perform the shift change control and the lock-up control for the automatic transmission 15. To perform these controls, the controller 11 inputs a signal f from a vehicle speed sensor 21 to detect a vehicle speed as well as the signals a, b and c.

Then, the controller 12 performs the slipping control for the electromagnetic clutch 11 in response to vehicle drivability. The connecting and disconnecting controls for the electromagnetic clutch 11 are actuated in response to the accelerator opening degree detected by the sensor 14 and the gear stage of the automatic transmission 15. Further, the controller 12 performs the control for adjusting the opening of the bypass valve 10 in response to the accelerator opening and the gear stage when the electromagnetic clutch is actuated so as to control the supercharged pressure. Therefore, the controller 12 outputs a clutch control signal g to the electromagnetic clutch 11 and a bypass control signal h to the actuator 22 for the bypass valve 10. Also, the controller 12 outputs a throttle control signal i so as to control the actuator 23 for the throttle valve 8 in response to the accelerator opening degree.

Figure 25:
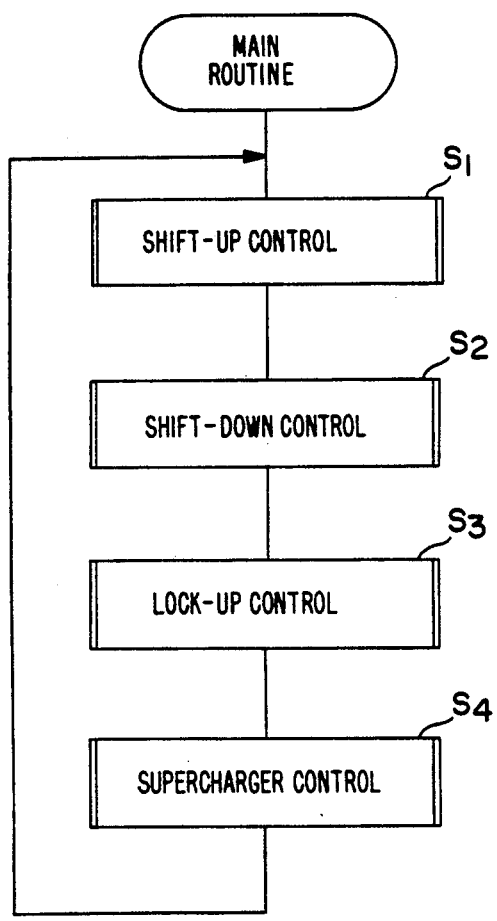
FIG. 25 is a flow chart showing a main routine for the control system of the embodiment of FIG. 24.

Hereinafter, referring now to FIGS. 25 to 37, the details of the control of the whole system by the controller 12 are described. FIG. 25 is a flow chart showing a main routine. The controller 12 performs steps S1, S2 and S3 to control the shift-up, shift-down and lock-up operations for the automatic transmission 15 and step S4 to control the clutch and the supercharged intake air pressure for the supercharger.

For the shift-up control and the shift-down control, the controller 12 outputs the shift change signal d to the shift solenoid valves 17 to 19 in response to the accelerator opening degree and the vehicle speed which are detected by the sensors 14 and 21, which are shown in FIG. 24, in order to set the gear stage of the automatic transmission 15 adequately in response to the engine operating conditions. For the lock-up control, the controller 12 outputs the lock-up signal e to the lock-up solenoid valve 20 in response to the accelerator opening degree and the vehicle speed so as to engage or release the lock-up device of the torque convertor provided in the automatic transmission 15 depending on the vehicle running conditions.

On the other hand, the controller 12 performs an interruption routine according to the predetermined time schedule as well as the main routine. The interruption routine is performed according to FIG. 26. First of all, in step S11, the controller 12 inputs the signals a, b, c and d from the sensors 13, 14, 14a and 21 which are shown in FIG. 24. Then, in steps S12 and S13, the controller 12 outputs the shift change signals d and the lock-up signal e to the shift solenoid valves 17 to 19 and the lock-up solenoid valve 20, respectively. Further, in step S14, the controller 12 adds 1 to the value of the counter T of the slipping timer for the clutch control which is described in detail later. Then, in step S15, the controller 12 outputs the clutch control signal g and the bypass control signal h to the electromagnetic clutch 11 and the actuator 22 for the bypass valve 10, respectively.

Figure 27:
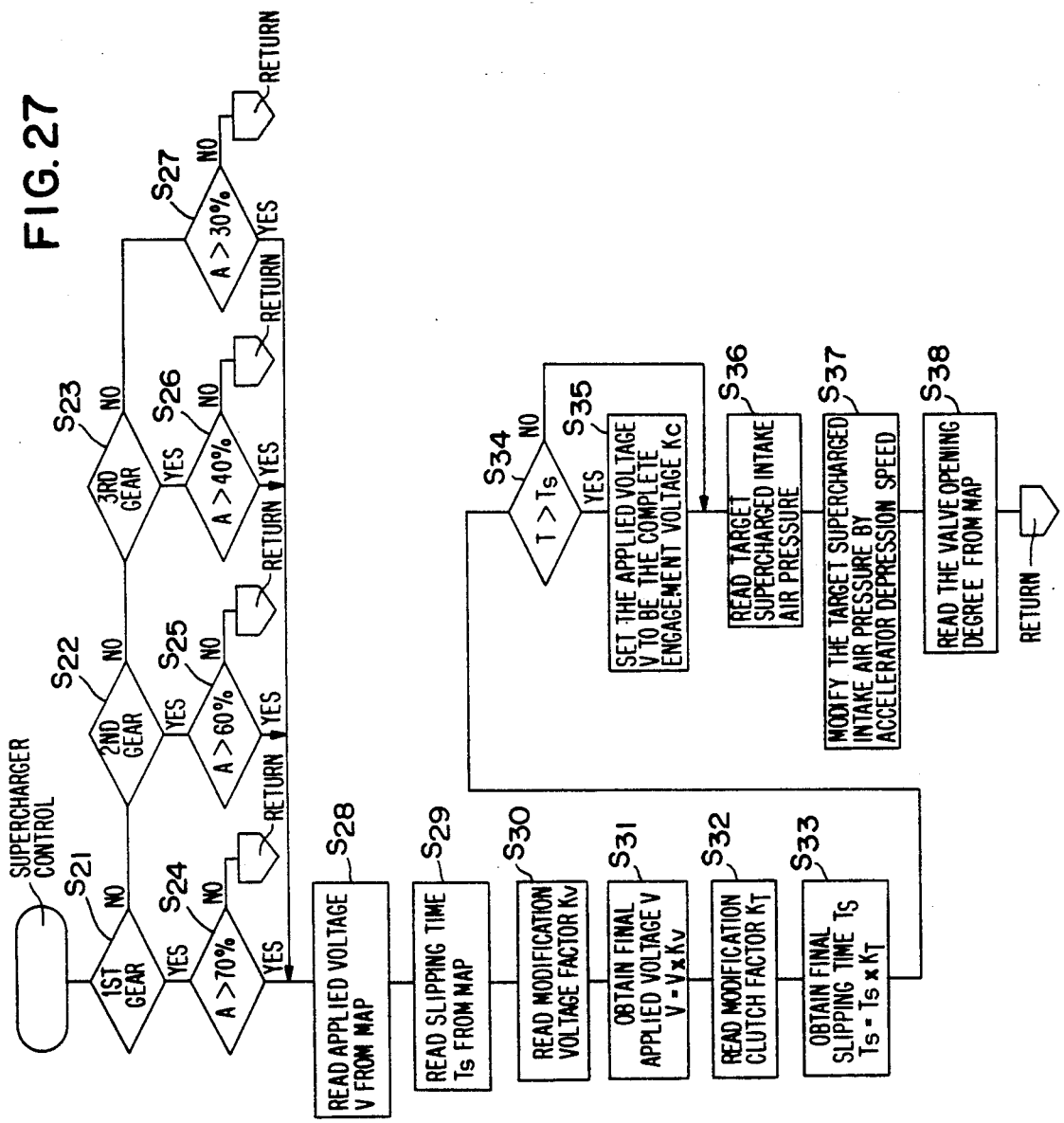
FIG. 27 is a flow chart showing a sub routine for the supercharged intake air pressure control of this embodiment.
Figure 28:
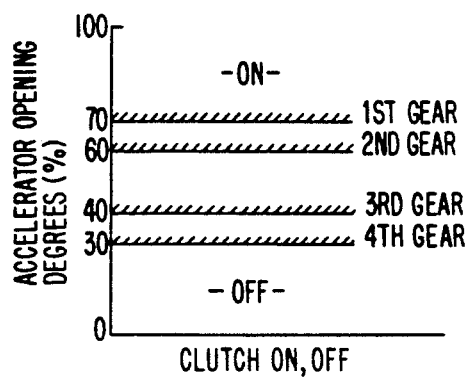
Figure 35:
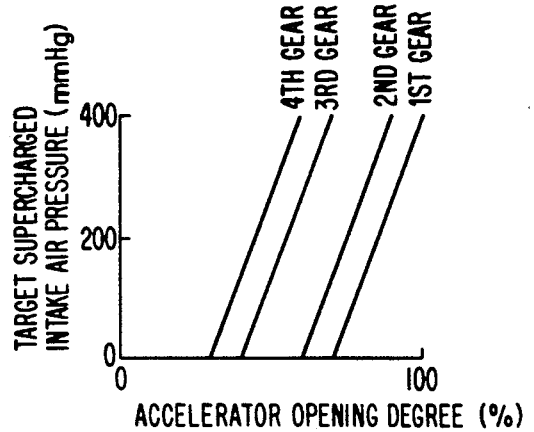

On the other hand, the supercharger control of the main routine indicated in step S4 in FIG. 25 is performed according to the flow chart of FIG. 27. In this control, at first in steps S21 and S23, the controller 12 detects the gear stage of the automatic transmission 15, then in steps S24 to S27, the controller 12 judges if the accelerator opening degree A is greater than the predetermined opening degree in each gear stage. That is, when the accelerator opening degree is less than 70% in the first gear stage, or less than 60% in the second gear stage, or less than 40% in the third gear stage, or less than 30% in the fourth gear stage, the controller 12 skips steps S28 to S34 and returns to the beginning of the flow chart. By this control, as shown in FIG. 28, when the accelerator opening degree is less than the predetermined value in each gear stage, the electromagnetic clutch 11 is held in the OFF state to stop the supercharger 5. At the same time, in this engine load condition, the bypass valve 10 is kept in the fully opened state so that the intake air can be introduced into the cylinders of the engine 2 through the bypass passage 9.

On the other hand, in each gear stage of the automatic transmission 15, when the accelerator opening degree A is larger than the above predetermined opening degree; i.e. the engine load resides in the higher load region which is determined in each gear stage, the controller 12 performs steps S28 to S34. First of all, in step S28, the controller 12 reads the applied voltage V to electromagnetic clutch 11 according to the predetermined applied voltage map, then, in step S29, reads the slipping time Ts from the predetermined slipping map to control the slipping condition of the electromagnetic clutch 11 during its engagement.

Figure 29:
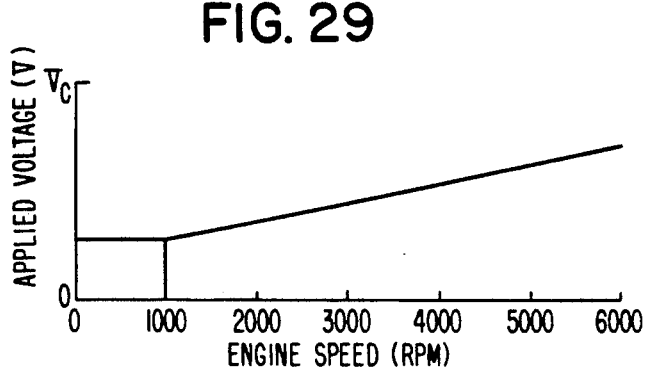
Figure 36:
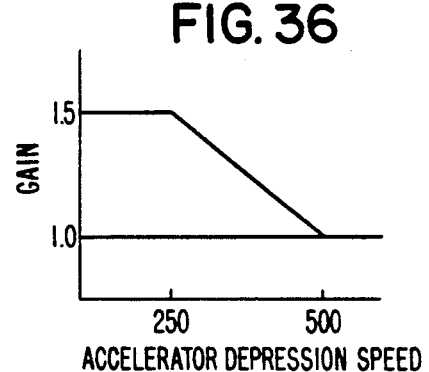
Figure 30:
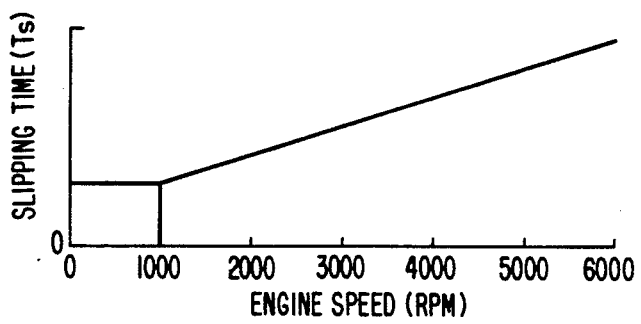
Figure 37:
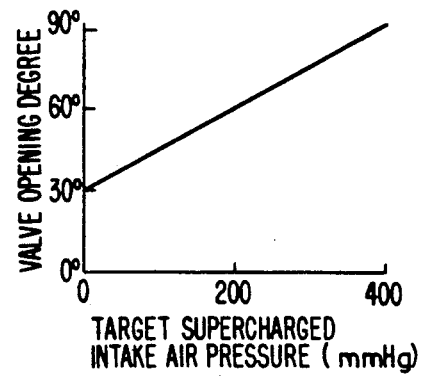

FIG. 29 shows the applied voltage map. The applied voltage V is designed to be a smaller value than the complete engagement voltage Vc which is designed to engage the electromagnetic clutch completely, and also, is designed to become greater as the engine speed increases. FIG. 30 shows the slipping time map. The slipping time Ts is designed to become longer as the engine speed increases.

Then, the controller 12, in step S30, reads the modification voltage factor Kv, which is predetermined according to the ambient air pressure, from the map shown in FIG. 31. Further, the controller 12, in step S31, obtains the final applied voltage V by multiplying this modification voltage factor Kv with the applied voltage V of step S28. By the way, this modification voltage factor Kv is designed to be 1 when the ambient air pressure is a standard value (760 mmHg) and to become smaller as the ambient air pressure decreases. In addition, the controller 12, in step S32, reads the modification clutch time factor Kt. Then, the controller 12, in step S33, obtains the final slipping time Ts by multiplying this modification clutch time factor Kt by the slipping time Ts of step S29. This modification clutch time factor Kt is designed to be 1 when the ambient air pressure is a standard value (760 mmHg) and to become larger as the ambient air pressure decreases.

Figure 26:
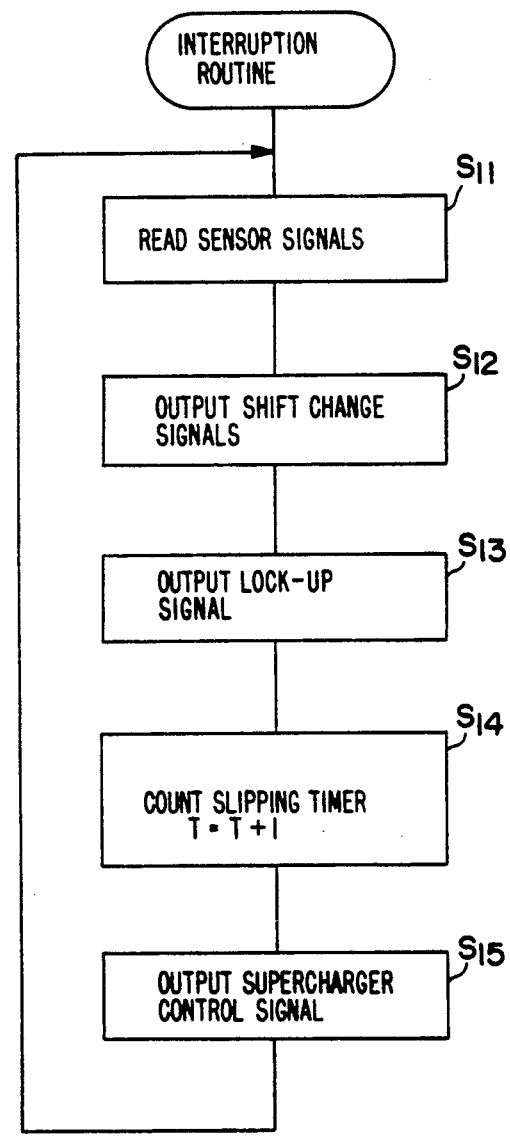
FIG. 26 is a flow chart showing an interruption routine for the control system of this embodiment.

Further, the controller 12, in step S34, judges if the count value T of slipping timer counted in step S14 of the interruption routine shown in FIG. 26 becomes greater than the slipping time Ts obtained in step S33. In this instance, the slipping timer initiates its counting from the time when the accelerator opening degree A becomes greater than the predetermined opening degree in any step of the above steps S24 to S27. And, when the count value T exceeds the slipping time Ts, the controller 12 performs step S35 to set the applied voltage V to the electromagnetic clutch 11 to be the complete engagement voltage Vc.

Then, the controller 12 outputs the clutch control signal g to the electromagnetic clutch in step S15 of the above interruption routine so that the electromagnetic clutch 11 can be engaged by being actuated through the applied voltage V read from the map in step S31 or the complete engagement voltage Vc set in step S35.

In accordance with this arrangement, when the accelerator opening A becomes greater than the predetermined value in each gear stage, the electromagnetic clutch 11 is controlled to engage by being controlled through the voltage V, which is smaller than the complete engagement voltage Vc, until the slipping time Ts passes. After the time period of Ts, the electromagnetic clutch 11 is controlled to engage completely by having applied thereto the complete voltage Vc. Therefore, when the operating condition of the supercharger 5 is shifted from the non-operational region to the operational region, the engagement shock loaded on the engine output shaft abruptly at the timing of the clutch engagement can be reduced. And also, the electromagnetic clutch can be protected from significant wear caused by the strong engagement force, since the engagement of the electromagnetic clutch 11 is precisely controlled so as not to cause great friction between frictional elements.

Furthermore, since the applied voltage V is set to become smaller as the ambient air pressure decreases and the slipping time Ts is set to be longer as the ambient air pressure decreases, as shown in FIG. 33, the electromagnetic clutch 11 is controlled to engage more weakly and for a longer time during clutch engagement in the lower drivability condition. Therefore, when the vehicle is running in a high altitude place as shown in FIG. 34 it will take a longer time for the supercharger 5 to reach the predetermined speed; i.e. 1.5 times the engine speed. It can effectively prevent the clutch engagement shock from occurring.

In addition, in the operational region of the supercharger 5, the controller 12 performs the supercharged intake air pressure control after the above clutch control. Namely, according to the flow chart of FIG. 27 in step S36, the controller 12 reads the target supercharged intake air pressure, with a predetermined based on the accelerator opening degree and the gear stage, from the map shown in FIG. 35. Then, in step S37, the controller 12 reads the gain, which is predetermined based on the depression speed of the accelerator, from the map shown in FIG. 22. And then, the controller 12 modifies the above target supercharged intake air pressure by multiplying it with the gain. Further, in step S38, the controller 12 reads the target opening of the bypass valve 10 from the map shown in FIG. 37 to obtain the modified target supercharged intake air pressure. And, the controller 12 outputs the bypass control signal h according to the interruption routine in FIG. 26 to control the bypass valve 10 to open to the target opening, whereby the supercharged intake air pressure can be controlled to be an adequate value.

In the case that the drivability of the engine is lowered by insufficient warm up of the engine, the water temperature sensor to detect the cooling water temperature can be provided to detect such a condition. In this case, as a map for step S30 of FIG. 27, there is provided such a map that the modification voltage factor Kv becomes smaller than 1 when the water temperature is low. And, as a map for step S32 of FIG. 27, the modification clutch time factor Kt becomes larger than 1 when the water temperature is low. By doing so, the same effect as the above embodiment can be obtained.

Further, in the case that drivability is lowered by climbing an uphill road, a hill sensor to detect the uphill incline can be provided to detect such a condition. In this case, as a map for step S30 of FIG. 27, there is provided such a map that the modification voltage factor Kv becomes smaller than 1 when an uphill road is detected. And, as a map for step S32 of FIG. 27, the modification clutch time factor Kt becomes larger than 1 when the uphill road is detected. By doing so, the same effect as in the above embodiment can be obtained.

What is claimed is:

1. A clutch control apparatus for a mechanical supercharger, comprising:
   a supercharger driven by an output shaft of an engine and provided in an intake system, clutch means for connecting and disconnecting the supercharger with the output shaft of the engine so that the supercharger can be actuated in a predetermined engine operational region, engine speed detecting means for detecting engine speed, and clutch control means for controlling a slipping condition of the clutch means in response to the engine speed detected by the engine speed detecting means when the clutch means is operated to actuate the supercharger, said clutch control means controlling the slipping condition so that engagement force of the clutch means becomes larger and period of slipping time of the clutch means becomes longer as the engine speed detected by the engine speed detecting means increases.

* * * * *